(12) United States Patent
Yamada et al.

(10) Patent No.: US 11,598,295 B1
(45) Date of Patent: Mar. 7, 2023

(54) PUMP DRIVEN CRANKCASE VENTILATION SYSTEM

(71) Applicant: FORD GLOBAL TECHNOLOGIES, LLC, Dearborn, MI (US)

(72) Inventors: Shuya Shark Yamada, Novi, MI (US); Shawn Spannbauer, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/562,747

(22) Filed: Dec. 27, 2021

(51) Int. Cl.
*F02M 35/10* (2006.01)
*F02M 31/20* (2006.01)
*F01M 13/04* (2006.01)
*F01M 13/00* (2006.01)
*F01M 13/02* (2006.01)

(52) U.S. Cl.
CPC .. *F02M 35/10222* (2013.01); *F01M 13/0011* (2013.01); *F01M 13/028* (2013.01); *F01M 13/04* (2013.01); *F02M 31/20* (2013.01); *F01M 2250/00* (2013.01)

(58) Field of Classification Search
CPC ............ F02M 35/10222; F02M 31/20; F01M 13/0011; F01M 13/028; F01M 13/04; F01M 2250/00
See application file for complete search history.

(56) References Cited

U.S. PATENT DOCUMENTS

| | | | |
|---|---|---|---|
| 5,803,025 A | 9/1998 | Feucht | |
| 6,405,721 B1 | 6/2002 | Moren | |
| 8,439,022 B2 * | 5/2013 | Ruppel | F02M 25/06 123/573 |
| 10,590,872 B2 * | 3/2020 | Lacey | F02M 26/09 |
| 2002/0046743 A1 * | 4/2002 | Moren | F01M 13/023 123/559.1 |
| 2006/0243258 A1 * | 11/2006 | Withrow | F02M 25/0818 123/573 |
| 2007/0199550 A1 * | 8/2007 | Lindmark | F02M 25/06 123/572 |
| 2007/0261684 A1 * | 11/2007 | Hazelton | F02M 25/06 123/572 |
| 2013/0213370 A1 * | 8/2013 | Shirabe | F01M 13/0011 123/574 |
| 2014/0026870 A1 * | 1/2014 | Yamada | F02M 31/20 123/542 |
| 2018/0156168 A1 * | 6/2018 | Yaguchi | F01M 13/0011 |
| 2018/0187582 A1 * | 7/2018 | Yaguchi | B60T 13/52 |

FOREIGN PATENT DOCUMENTS

| | | |
|---|---|---|
| CN | 203531999 U | 4/2014 |
| JP | 4254847 B2 | 4/2009 |

* cited by examiner

*Primary Examiner* — Kurt Philip Liethen
(74) *Attorney, Agent, or Firm* — Vincent Mastrogiacomo; Brooks Kushman P.C.

(57) ABSTRACT

Engines and engine systems for managing blow-by gas and/or moisture therein, and methods of operating the same are disclosed. The engine systems may include an air intake system including a compressor such as a turbocharge and a charge air cooler. The engine system may also include an engine such as combustion engine have a crankcase. During combustion blow-by gas may be captured in the crankcase and recirculated back to the air intake system. The blow-by gas may be diluted by additional air such as fresh air prior to being recirculated. The system may also include a pump to facilitate recirculation.

17 Claims, 2 Drawing Sheets

PUMP DRIVEN CRANKCASE VENTILATION SYSTEM

TECHNICAL FIELD

The instant disclosure relates to engine systems. More specifically, the instant disclosure relates to managing condensation and/or blow-by gas from an engine.

BACKGROUND

Engine systems are prevalent throughout modern life. Engine systems convert other forms of energy into mechanical energy. But engine systems often rely on ambient air as fuel and/or for cooling. During combustion, combustion gases may leak or slip past the piston/cylinder head and may be collected in the crankcase. These gases may include oil and water. The composition of ambient/external air and/or blow-by gases may vary based on weather conditions, location, and numerous other factors.

SUMMARY

An engine system including an air intake system, and an engine downstream of the air intake system is disclosed. The air intake system may include a charge air cooler for cooling received air. The engine may include an intake manifold, engine block and crankcase. The engine manifold may connect the engine to the air intake system. The engine system may also include a first passage from the engine to the air intake system. The first passage may connect the crankcase to the air intake system downstream of the charge air cooler. The engine system may also include a second passage from the air intake system to the engine. The second passage may be configured to deliver fresh air to the crankcase for diluting blow-by gas of combustion. The fresh air may also create positive crankcase ventilation. The engine system may also include a pump configured to remove blow-by gas from the crankcase. The pump may be disposed in the first passage to transport diluted blow-by gas from the crankcase to the air intake system downstream of the throttle.

An engine including an intake manifold, an engine block and a crankcase is also disclosed. The intake manifold is configured to receive air from an air intake system. The engine block is connected to the intake manifold and a crankcase opposite the intake manifold. The engine block and crankcase are configured to create mechanical energy from chemical energy such as by via combustion. The crankcase may include a fresh air inlet configured to receive additional air such as fresh air. The additional air may be received from the air intake system during operation. The additional air may create positive crankcase ventilation and dilute the blow-by gas. The crankcase may also include an outlet configured to transfer or transport the blow-by gas back to the air intake system. The outlet may also be configured to connect to a pump for pumping the blow-by gas into the air intake system.

A method of managing blow-by gases including receiving fresh air via an air intake system, delivering the air to the engine such that it is received for combustion, capturing blow-by gas from combustion and recirculating the blow-by gas back to the air intake system. The air received via the air intake system may be condensed such as by a compressor and cooled such as by a charge air cooler before delivering it to the engine. The blow-by gas may be filtered such that oil is separated from it before recirculating back to the air intake system. The blow-by case may be delivered back to the air intake system via a first passage. A pump may be used to transport the blow-by gas from the crankcase through the first passage and to the air intake system. The blow-by gas may be diluted by additional air such as fresh air via a second passage from the air intake system to the crankcase. The first passage may connect the crankcase to a downstream portion of the air intake system such as downstream of the charge air cooler. The second passage may connect an upstream portion of the air intake system such as upstream of the charge air cooler with the crankcase for fresh air ventilation.

DETAILED DESCRIPTION

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1, to 2.1 the following numbers 1.2, 1.3, 1.4, 1.5, 1.6, 1.7, 1.8, 1.9, and 2.0 can be selected as lower or upper limits.

Figure 1:
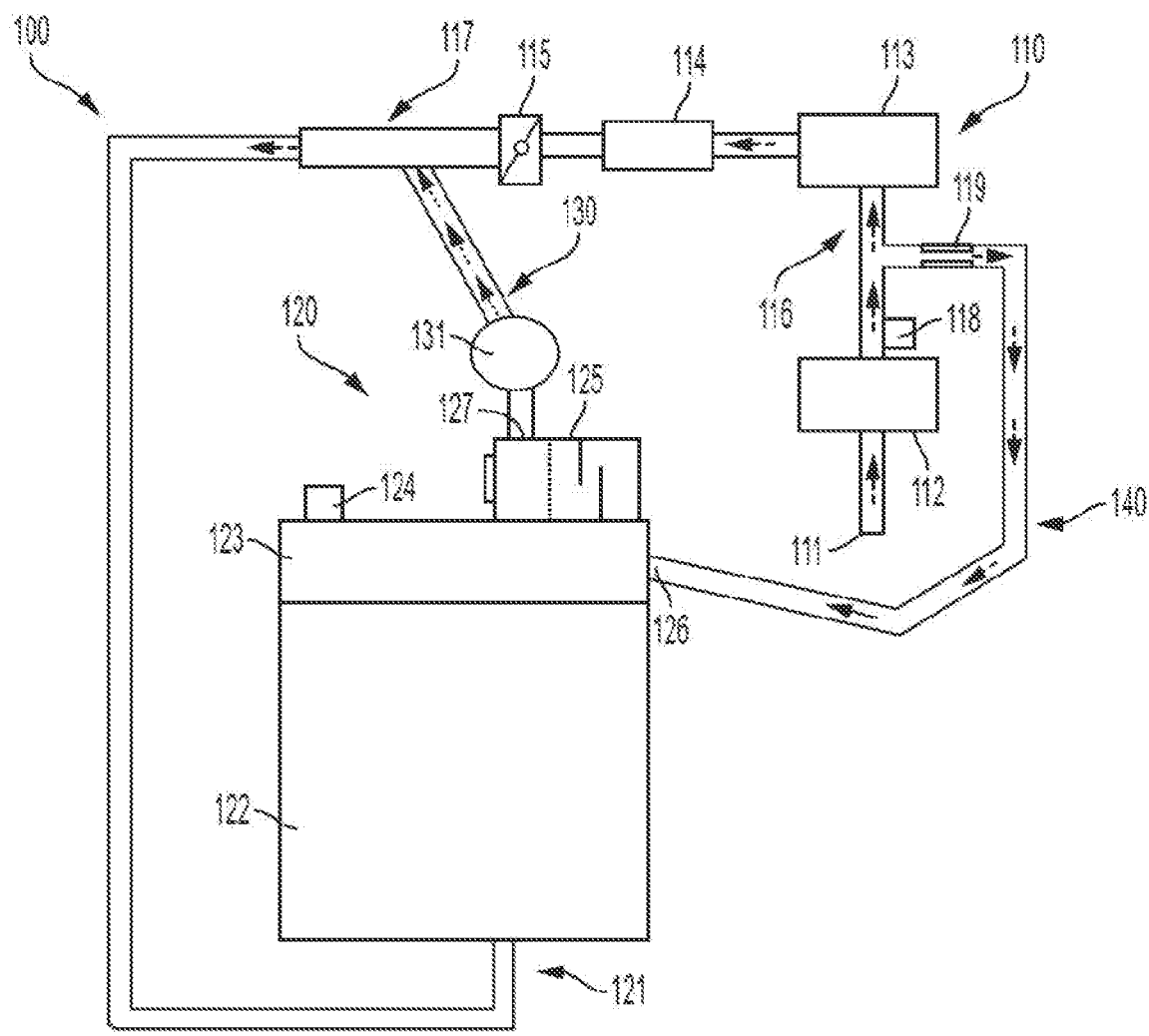
FIG. 1 is a schematic of an engine system.

As shown in FIG. 1, an engine system 100 is disclosed. The engine system 100 may include an air intake system 110, au engine 120, and a plurality of passages connecting the air intake system 110 and engine 120. The engine 120 is located downstream of the air intake system 110 because the air intake system is responsible for delivering a supply of air to the engine. The plurality of passages may include a first passage 130 connecting the engine 120 to the air intake system 110 for reintroducing gases from the engine 120 back into the air intake system 110 and a second passage 140 for providing additional air from the air intake system 110 to the engine 120.

The air intake system 110 is responsible for providing quality air to the engine for combustion and/or cooling. The air intake system 110 may include a fresh air receiver 111, an air cleaner and/or filter 112, a compressor 113, a charge air cooler 114, and a throttle 115. The fresh air receiver 111 is responsible for receiving a sufficient amount of air from the ambient or external environment for fueling combustion and/or cooling the engine 120. An air cleaner and/or filter 112 assist in conditioning the ambient/external/fresh air by removing contaminant such as dirt, debris or particulate. The compressor 113 compresses the air to provide a greater density air for the engine. The higher density air allows the engine to provide greater power. For example, the compressor 113 may be a supercharger or turbocharger. A charger air cooler 114 may be used in combination with the compressor 113 because the compressor may heat the compressed air. The charge air cooler 114 may further increase the density of the compressed air by cooling it. Accordingly, the charge air cooler 114 may be located downstream of the compressor 113. The air intake system may also include a throttle 115 for controlling the amount of (cooled and condensed) air received by the engine 120 from the air intake system 110. The throttle 115 may be located downstream of the charge air cooler 114 but upstream of the engine 120. The throttle 115 may include a throttle body and a throttle valve such that the throttle valve can be opened and closed to control the amount of air going to the engine 120.

The engine 120 may convert one form of energy into mechanical energy. In a combustion engine, the engine 120 converts chemical energy to mechanical energy via combustion. In a combustion engine, an intake manifold 121 may connect the air intake system 110 and the engine 120. The intake manifold 121 is responsible for receiving the (cooled and condensed) air from the air intake system 110 for combustion in the engine 120. The air may be mixed with fuel before undergoing combustion in a combustion chamber of the engine block 122. Combustion then causes a piston/cylinder head to move through a cylinder located in the engine block 122 which rotates a crank shaft located in the crankcase 123. In a refinement, the crankcase 123 may be opposite the intake manifold 121.

Combustion gases and/or fluids in the combustion chamber may leak past the piston/cylinder head into the crankcase 123. This may raise the pressure in the crankcase 123 which may be detected by a sensor 124. For example, a pressure sensor may detect the amount of blow-by gas in the crankcase 123. The blow-by gas may be introduced into the air intake system 110 after, for example, being run through a separator 125. The separator 125 may separate unwanted substances such as oil. The separator 125 may be integrated with the crankcase 123 or separate from the crankcase 123. The blow-by gas may also be diluted such that it does not negatively affect combustion. For example, a passage 140 may connect the air intake system 110 to the crankcase 123 such that an additional amount of air from the air intake system 110 may be added to the blow-by gas to dilute it. The passage 140 may be connected to the crankcase 123 at a fresh air inlet 126. The fresh air inlet 126 may be configured to receive fresh air from the air intake system 110. If the pressure in the air intake system 110 is greater than the crankcase 123 it may also create positive crankcase ventilation. In a refinement, the passage 140 connects an upstream portion 116 of the air intake system 110 to the crankcase for ventilation and dilution. If the connection is far enough upstream it may directly introduce fresh air that has not yet been condensed or cooled. For example, the passage 140 may be connected to the air intake system downstream of the fresh air receiver 111 but upstream of the compressor 113. Alternatively, the passage 140 may include a separate fresh air intake for diluting the blow-by gas. The passage 140 may also include a governor 119 such as a metering orifice. The orifice may be about 0.1 to 3 mm, or more preferably 0.5 to 2.5 mm, or even more preferably 1 to 2 mm.

The diluted blow-by gas may then be reintroduced into the air intake system such as by the passage 130 from the crankcase 123 to the air intake system 110. In a variation, the passage 130 may connect an outlet 127 of the crankcase 123 to a downstream portion 117 of the air intake system 110. In a refinement, the downstream portion 117 may be downstream of the charge air cooler. For example, the downstream portion 117 may be downstream of the throttle 115. The passage 130 connecting the crankcase 123 and downstream portion 117 may include a pump 131. The pump 131 moves fluid such as gases (e.g., air and blow-by gas) in a specific direction. The pump 131 may, for example, be a reciprocating or a rotary pump. In a refinement, the pump 131 may be configured to operate at a speed/rate that corresponds to the amount of blow-by gas in the crankcase 123. In a refinement, the amount of blow-by gas may be determined by the sensor 124 in the crankcase 123. The sensor 124 may be a pressure sensor such that the pump 131 is configured to operate a speed/rate corresponding to the pressure determined by sensor 124. Pump 131 may also be configured to keep the pressure within the crankcase 123 lower than the pressure of the upstream portion 116 of the air intake system 110. A second sensor 118 such as a pressure sensor may be in the upstream portion 116 of the air intake system 110. Pump 131 may be configured to operate such that the pressure detected at sensor 124 is less than the pressure detected at sensor 118. This may facilitate positive crankcase ventilation such that the blow-by gas is diluted.

Figure 2:
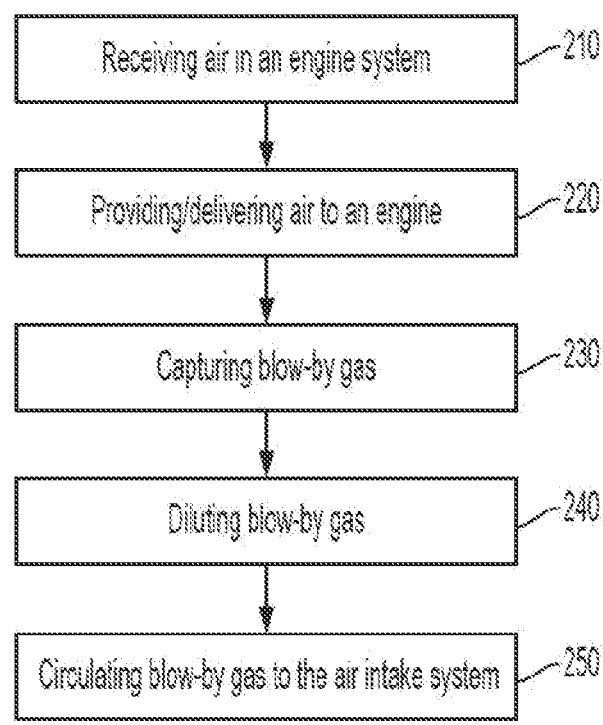
FIG. 2 is a flow chart for a method of managing blow-by gas.

A method 200 of managing blow-by gas and/or moisture therein is also disclosed, as shown in FIG. 2. The method 200 may include receiving air into an engine system (i.e., step 210), capturing blow-by gas from an engine of the engine system (i.e., step 230), and diluting the blow-by gas (i.e., step 240) via positive crankcase ventilation before introducing it into an air intake system (i.e., step 250). The air may be fresh air from the ambient or external environment and may be received via an air intake system (i.e., step 210). The air intake system may condition the air before providing/delivering it to the engine (i.e., step 220). For example, the air may be condensed via a compressor and/or cooled via a cooler such as a charge air cooler. The air may also be filtered or cleaned to remove dirt, debris, and/or particulate. The (cooled and/or condensed) air may be delivered or received by the engine (i.e., 220) such as for combustion. During combustion in an engine block of the engine, blow-by gas may be received or captured in a crankcase of the engine (i.e., step 230). This may increase the pressure of the crankcase which may be detected by a sensor. The blow-by gas may be circulated back towards and introduced into a downstream portion of the air intake system (i.e., step 250). A pump and/or positive crankcase ventilation via a fresh air inlet which may be from an upstream portion of the air intake may facilitate circulating the blow-by gas back to the downstream portion of the air intake system. The fresh air inlet may also dilute the blow-by gas during operation (i.e., step 240). The pump may operate at a speed/rate corresponding to the amount of blow-by gas which may be determined by the senor in the crankcase. The blow-by gas may be run through a separator such that oil may be separated before being circulated back to the air intake system and/or engine. The diluted blow-by gas may be circulated to the air intake system via a first passage and the pump may be located in or adjacent to the first passage.

The fresh air may be received from the air intake system via a second passage. The second passage may be restricted to determine the amount of fresh air received by the crankcase. The first passage may connect the crankcase to a downstream portion of the air intake system such as downstream of the charge air cooler and/or throttle. The second passage may be connected to the air intake system upstream of the charge air cooler, and/or compressor.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An engine system comprising:
   an air intake system having a charge air cooler;
   an engine downstream of the charge air cooler and having a crankcase and an intake manifold connecting the air intake system to the engine;
   a first passage from the crankcase to the air intake system, the first passage connecting to the air intake system downstream of the charge air cooler;
   a second passage from the air intake system to the crankcase, the second passage configured to deliver fresh air to the crankcase for diluting blow-by gas contained within the crankcase and resulting from gas travelling around a cylinder head of the engine, and creating positive crankcase ventilation during operation;
   a pump disposed in the first passage and configured to remove the diluted blow-by gas from the crankcase and pump it to a downstream portion of the air intake system that is downstream of the charge air cooler.

2. The engine system of claim 1, wherein the crankcase includes a separator connected to the first passage such that blowby gases are circulated through the separator prior to first reaching the first passage during operation.

3. The engine system of claim 1, wherein the pump is configured to operate at a speed corresponding to an amount of the blow-by gas being discharged from the crankcase.

4. The engine system of claim 3, wherein the crankcase includes a first sensor to measure a crankcase pressure for determining the amount of the blow-by gas.

5. The engine system of claim 1, wherein the crankcase includes a first sensor to measure a crankcase pressure and the air intake system includes a second pressure sensor for measuring an air intake pressure such that the air intake system is configured to operate the pump so the air intake pressure is greater than the crankcase pressure.

6. The engine system of claim 1, wherein the second passage includes a metering orifice configured to control an amount of fresh air diluting the blow-by gas.

7. The engine system of claim 1, wherein the first passage is connected to the air intake system downstream of a throttle.

8. An engine comprising:
   an intake manifold configured for receiving air from an air intake system;
   an engine block connected to the intake manifold; and
   a crankcase connected to the engine block opposite the intake manifold, the crankcase having a fresh air inlet and an outlet such that the fresh air inlet is configured to receive fresh air direly from the air intake system during operation to dilute blow-by gas obtained from gas that leaks past a piston head during combustion and provides positive crankcase ventilation, the outlet configured to be connected to a pump for pumping the blow-by gas into the air intake system downstream of a charge air cooler.

9. The engine of claim 8, wherein a separator is disposed between the outlet and the pump.

10. The engine of claim 8, wherein the inlet includes a metering orifice.

11. The engine of claim 8, wherein the crankcase includes a sensor for determining an amount of blow-by gas during operation.

12. A method of managing blow-by gases comprising:
    receiving air into an air intake system;
    providing condensed air by condensing the air with a compressor;
    providing cooled condensed air by cooling the condensed air with a charge air cooler;
    receiving the cooled condensed air in an engine;
    capturing blow-by gas that slips past a cylinder head from the engine in a crankcase during combustion;
    separating oil from the blow-by gas; and
    pumping via a pump diluted blow-by gas into the air intake system from the crankcase via a first passage by diluting the blow-by gas with additional air received from a second passage, the first passage connecting the crankcase to the air intake system downstream of the charge air cooler and the second passage connecting air intake system upstream of the charge air cooler to the crankcase.

13. The method of claim 12, wherein the second passage is connected upstream of the compressor in the air intake system.

14. The method of claim 13, wherein the first passage is connected downstream of a throttle.

15. The method of claim 12, further comprising operating the pump at a rate that corresponds to an amount of blow-by gas being captured in the crankcase.

16. The method of claim 15, further comprising detecting the amount of blow-by gas via a pressure sensor in the crankcase.

17. The method of claim 12, further comprising controlling an amount of the additional air used to dilute the blow-by gas via a metering orifice located in the second passage.

* * * * *